Feb. 24, 1970   J. M. COMSTOCK   3,497,661
METHOD OF AND APPARATUS FOR PERCUSSIVE STUD WELDING
Filed Aug. 3, 1965   2 Sheets-Sheet 1

INVENTOR.
JAMES M. COMSTOCK
BY *Jack M. Wiseman*
ATTORNEY

Feb. 24, 1970  J. M. COMSTOCK  3,497,661
METHOD OF AND APPARATUS FOR PERCUSSIVE STUD WELDING
Filed Aug. 3, 1965  2 Sheets-Sheet 2

INVENTOR.
JAMES M. COMSTOCK
BY Jack M. Wiseman
ATTORNEY

United States Patent Office 3,497,661
Patented Feb. 24, 1970

3,497,661
METHOD OF AND APPARATUS FOR PERCUSSIVE
STUD WELDING
James M. Comstock, 380 North Lake Drive, Apt. 29,
San Jose, Calif.
Filed Aug. 3, 1965, Ser. No. 476,856
Int. Cl. B23k 9/22
U.S. Cl. 219—96                                              2 Claims

ABSTRACT OF THE DISCLOSURE

Disclosed is an apparatus for electric welding by arc formation and percussion which includes a holder to keep one workpiece stationary, a second holder to move the other workpiece into forceful contact with the first workpiece and an electrical circuit in which a capacitor discharges through the joint between the workpieces at the instant of contact. Also included in the circuit is a variable element settable for overdamping and, in the first holder, a variable weight consisting of lead shot for inhibiting bounce as well as providing appropriate percussive impact.

---

The present invention relates in general to welding, and more particularly to apparatus for percussive stud welding.

An object of the present invention is to provide improved apparatus for percussive stud welding.

Another object of the present invention is to provide apparatus for percussive stud welding that produces more consistently high-quality welds.

Another object of the present invention is to provide apparatus for percussive stud welding that improves the weld tensile strength.

Another object of the present invention is to provide apparatus for improving the percussive stud welding of aluminum.

Another object of the present invention is to provide apparatus for the percussive stud welding of aluminum which achieves improved weld tensile strength.

Another object of the present invention is to provide apparatus for percussive stud welding of 6061–T6 wrought aluminum alloy.

Another object of the present invention is to provide apparatus for percussive stud welding of 6061–T6 wrought aluminum alloy which achieves improved weld tensile strength.

Another object of the present invention is to provide an improved method of percussive stud welding.

Other and further objects and advantages of the present invention will be apparent to one skilled in the art taken from the following description taken in conjunction with the accompanying drawings, in which.

Figure 1:
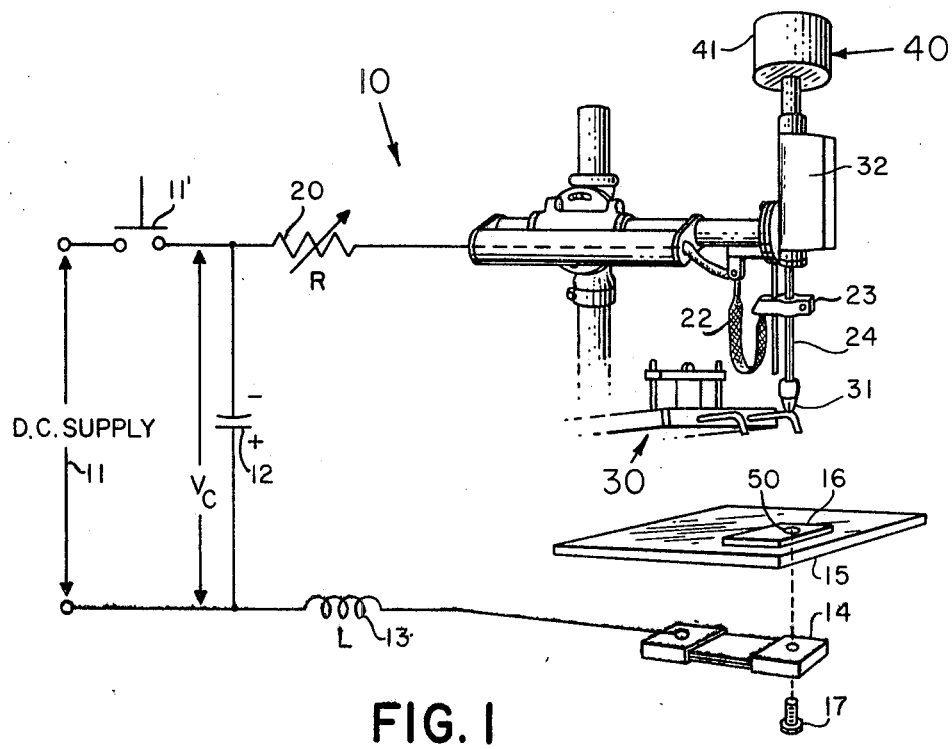
FIG. 1 is a schematic diagram of the percussive stud welding apparatus embodying the present invention.

Illustrated in FIG. 1 is the percussive stud welding apparatus 10 of the present invention which comprises a source 11 of direct current voltage. Connected in parallel with the source of direct current is a storage capacitor 12. A switch 11' is interposed between the source 11 of direct current voltage and the storage capacitor 12. When the switch 11' is closed, the storage capacitor 12 charges to a direct current voltage of a magnitude $V_c$.

In series with one side of the storage capacitor 12 is an inductance coil 13, which is also connected in series with a terminal strip or current shunt 14. The terminal strip 14 is suitably attached to a work support 15. Disposed on the work support 15 is a work piece 16. By means of a screw or any suitable contact member 17, an electrical connection is established between the storage capacitor 12 and the work piece 16 over the following path: capacitor 12, inductance coil 13, terminal strip 14, contact 17 and work piece 16.

Figure 2:
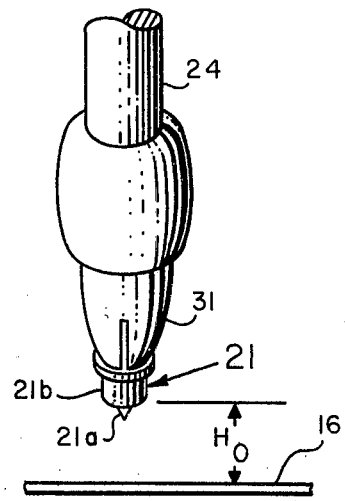
FIG. 2 is an enlarged diagrammatic elevation view of a collet holding the stud in spaced relation to the work piece.

In series with the other side of the capacitor 12 is a variable resistor 20, which is also connected in series with a stud 21 shown enlarged in FIGURE 2. The stud 21 has a reduced diameter tip 21a projecting downwardly, which has a conical configuration. An electrical connection is established between the storage capacitor 12 and the tip 21a of the stud 21 over the following path: capacitor 12, resistor 20, a flexible conductor 22, collar 23, shaft 24, collet 31, stud 21 and stud tip 21a.

As shown in FIG. 1, the shaft 24 is mounted for vertical movement. The collar 23 is secured to the shaft 24 for movement therewith. Likewise, the stud 21 is secured to the shaft 24 for vertical movement therewith through the collet 31 (FIG. 2) and when impelled against the work piece 16 causes an impact therewith.

Figure 5:
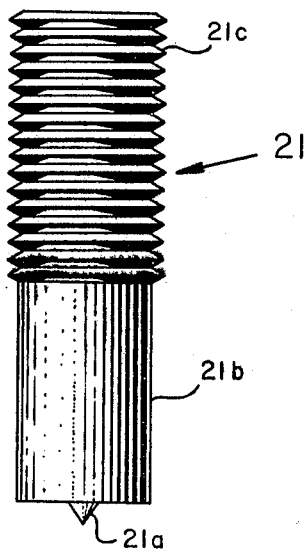
FIG. 5 is an enlarged perspective view of the stud of the present invention.

The components to be welded together are the stud 21 and the work piece 16. In the exemplary embodiment, the work piece 16 is made of aluminum or an aluminum alloy, such as 6061–T6 wrought aluminum alloy and the stud 21 is made of the same material. It is to be observed that the work piece 16 and the stud 21 with the tip 21a are the electrodes. For this reason, the tip 21a has a conical configuration, since it tends to achieve consistent arc initiation. In addition, the stud 21 (FIG. 5) has a reduced diameter smooth cylindrical section 21b between the tip 21a and a threaded section 21c. By virtue of the reduced diameter smooth cylindrical section 21b, the tensile strength of the weld is not limited to the root diameter of the threaded section 21c. The threaded section 21c is gripped by the collet 31.

Figure 3:
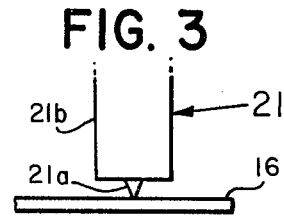
FIG. 3 is a diagrammatic view of the stud contacting the work piece.

Initially, the storage capacitor 12 is charged. Thereupon, the shaft 24 is lowered to impel the stud 21 for causing an impact between the stud tip 21a and the work piece 16. When the tip 21a contacts the work piece 16 (FIG. 3), the energy stored in the capacitor 12 is instantaneously discharged over the following path one side of the capacitor 12, inductance coil 13, terminal 14, work support member 15, work piece 16, stud 21, collet 31, shaft 24, collar 23, conductor 22, resistor 20 and the other side of the capacitor 12.

Figure 4:
FIG. 4 is a diagrammatic view of the stud welded to the work piece.

When the direct current flows over the previously described path for the discharge of the storage capacitor 12, an arc is produced between the conical tip 21a of the stud 21 and the work piece 16. This action melts the full diameter of the stud 21 or the diameter of the reduced diameter section 21b of the stud 21 and slightly greater area of the work piece 16 forming a heat union therebetween. The weld is completed by the impact force between the stud 21 and the work piece 16. At the completion of the weld, the tip 21a is melted away and the stud 21 is permanently secured to the work piece 16 (FIG. 4).

For retaining the work piece 16 in a fixed location on the work support 15 during the welding operation and for enabling the stud 21 to be precisely located on the work piece 16, a conventional and well-known work clamp 30 is provided. The stud 21 is initially placed in the collet 31 through the threaded section 21c thereof and is held thereinto until the welding operation is completed. The collet 31 is fixedly secured to the shaft 24 for movement therewith and serves to carry the stud 21 in its contact and impact movement with the work piece 16 until the welding action is completed. Thereupon, the collet 31 releases the stud 21.

According to the present invention, the drop-shaft 24 is journalled in suitable bearings 32 for vertical movement and the shaft 24 depends from a drop-weight gravity percussive arrangement 40, which controls the impact force between the stud 21 and the work piece 16 and also controls the upset force between the stud 21 and the work piece 16 during and after impact. The bearings 32 serve to reduce the friction on the shaft 24 for improving the regulation of the velocity of travel of the stud 21 up to the time of impact.

When the drop shaft 24 is released to start the welding operation, the shaft 24 and the stud 21 lower under the force of gravity toward the work piece 16. The impact force between the stud 21 and the work piece 16 is controlled by the weight or mass of the drop weight arrangement 40 and the height $H_O$ (FIG. 2), which is the static distance between the base of the stud 21 and the work piece 16. More specifically, the height $H_O$ represents the distance between the confronting surfaces of the base of the stud 21 and the work piece 16 before the shaft 24 is released to impel the stud 21. It is apparent that the velocity at which the stud 21 travels immediately prior to impact is related to the static height $H_O$, since a drop-weight gravity arrangement 40 is employed. The impact force between the stud 21 and the work piece 16 is directly proportional to the weight or mass of the drop-weight arrangement 40 and the aforementioned static distance $H_O$.

To improve the weld between the stud 21 and the work piece 16, the rebound between the stud 21 and the work piece 16 should be reduced. It is apparent that the stud 21 bounces immediately after impact with the work piece 16. The rebound is particularly undesirable during the time the weld solidification occurs. The period for the cooling of the weld is generally about twenty milliseconds after the arc between the stud 21 and the work piece 16 is extinguished. Since both weld solidification and stud rebound occurs during this period, it is desirable to minimize the stud rebound.

In the preferred embodiment of the present invention, the drop-weight arrangement 40 comprises a suitable closed container 41 in which is contained round lead shot. An alternate arrangement within the contemplation of the present invention is a solid drop-weight arrangement. The exemplary embodiment employs one-fourth inch diameter round lead shot. It was found that if the shot were maintained in a loose state before each drop, the rebound of the stud 21 after impact with the work piece 16 was delayed until at least twenty milliseconds after the arc between the stud 21 and the work piece 16 was extinguished.

In the method of the present invention for improving the weld tensile strength between the stud 21 and the work piece 16, it has been discovered that the following variables should be controlled for optimum result:

(a) static weight (W) of the drop-shaft 24 and the drop-weight arrangement 40;
(b) the static stud height ($H_O$) above the work piece;
(c) the capacitance (C) of the storage capacitor 12;
(d) the equivalent D-C circuit resistance (R) of the variable resistor 20;
(e) and the voltage ($V_C$) across the storage capacitor 12.

The combination of the above variables that maximizes the average weld tensile strength of the welding of a stud of 6061–T6 wrought aluminum alloy to a sheet of 6061–T6 wrought aluminum alloy is the following:

W=37.6 pounds
$H_O$=1.407 inches
C=0.0775 farad
R=26 milliohm
$V_C$=145.5 volts

Figure 6:
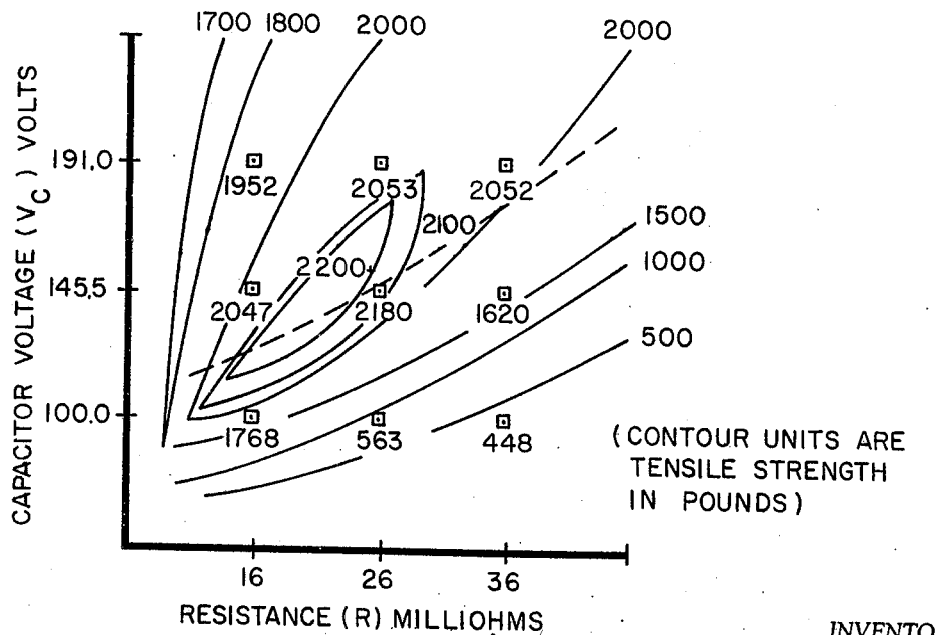
FIG. 6 is a graph illustrating tensile strength achieved in the welding of a stud to 6061–T6 aluminum with the percussive welding apparatus of the present invention interacting the variable resistance with the capacitor voltage.

The following range of the above variables shows the conditions under which the average tensile strength of the welding of a stud of 6061–T6 wrought aluminum alloy to a sheet of 6061–T6 wrought aluminum alloy exceeds or equals 2000 pounds for a ¼ inch diameter stud 21 as illustrated in FIG. 6:

| Variable | Setting at Observed Optimum | Range of Variable When Weld Tensile Stress is Equal to or Greater Than 40,800 Lbs./Sq. In. |
|---|---|---|
| Weight, W | 37.6 lbs | 30.6 to 46.6 lbs. |
| Height, $H_O$ | 1.407 inches | 0.85 to 2.05 inches. |
| Capacitance, C | 0.0775 farad | 0.0650 to 0.090 farad. |
| Resistance, R | 26 milliohm | 15 to 31 milliohms. |
| Voltage, $V_C$ | 145.5 volts | 100 to 195 volts. |
| Circuit Discharge Time Constant, $T_C$ | 1.95 millisecond | .97 milliseconds to 2.8 milliseconds. |
| Circuit Damping Factor, D $$D=\frac{R}{2}\sqrt{\frac{C}{L}}$$ | $$D=\frac{26(10^{-3})\text{ ohms}}{2}\sqrt{\frac{0.0775 \text{ farad}}{1.34(10^{-6})\text{ henry}}}$$ D=3.13. | D is greater than 1. |
| Inductance, L | 1.34 microhenry | |
| Arc Time | 1.2 milliseconds | |
| tm=Time of Max. Weld Current after arc initiation | 0.4 milliseconds | |
| $I_{max}$ at tm | 7,200 amps | |
| Average current density across stud face at tm | 147,000 amps/square inch | |

It has been found that stronger welds are attained when the discharge circuit for the capacitor 12 is operating in an overdamped mode. The circuit damping factor D is represented by the following formula:

$$D=\frac{R}{2}\sqrt{\frac{C}{L}}$$

The circuit is critically damped when D is equal to 1; underdamped when D is less than 1, and overdamped when D is greater than 1. In the preferred embodiment of the present invention, the factor D is 3.13. According to the present invention, the resistor 20 is made a variable one to adjust the discharge circuit for the capacitor 12 to an overdamped mode.

From FIG. 6, it is observed that maximum tensile strength is achieved when the resistance 20 is adjusted over a range between 4 to 50 milliohms interacting with capacitance voltage $V_C$ over a range between 100 to 195 volts.

For further improving the tensile strength of the weld, a flux concentrator 50 is disposed on the work piece 16 (FIGURE 1). The flux concentrator 50 may be made of steel and has a toroidal or annular configuration so as to surround the stud 21 when the tip 21a thereof contacts the work piece 16 to discharge the capacitor 12 instantaneously. The inner diameter of the flux concentrator 50 is larger than the diameter 21b of the stud 21. In this manner, a more uniform arc is created about the base of the stud 21 to ensure uniform melting of the stud 21. When the melting of the stud 21 is not uniform, the stud 21 will not be welded perpendicular to the engaging surface of the work piece 16 due to the impact force distorting the friction type collet 31 at the time of impact. Thus, to weld the stud 21 perpendicular to the confronting surface of the work piece 16, the arc created between the stud 21 and the work piece 16 should be uniform.

In the operation of the percussive stud welding apparatus 10, the source of D.C. voltage, after the switch 11' is closed, charges the storage capacitor 12. The work piece 16 is disposed on the work support 15 and is clamped to a precise location by the clamp 30. The stud 21 is detachably secured within the collet 31. Initially, the drop shaft 24 is in the raised position and the height between the base of the stud 21 and the work piece 16 is $H_O$.

The drop-shaft 24 is retained at the elevated position until the welding operation is to commence. Thereupon, the drop-shaft 24 with the drop-weight arrangement 40 is released to fall under the force of gravity. Instantaneously with the tip 21a of the stud 21 contacting the work piece 16 (FIG. 3), the storage capacitor 12 discharges over the following path: storage capacitor 12, inductance coil 13, terminal strip 14, contact 17, work support 15, work piece 16, stud 21, collet 31, drop-shaft 24, collar 23, flexible conductor 22, resistor 20 and storage capacitor 12. The current flowing over the just-described path for the discharge of the storage capacitor 12 creates an arc between the tip 21a of the stud 21 and the work piece 16. This action melts the full diameter of the stud 21 and a larger area of the work piece 16 forming a heat union therebetween. The weld is completed by the impact force between the stud 21 and the work piece 16. It is recalled that the drop-shaft 24 depends from the drop-weight arrangement 40 for impelling under the force of gravity the stud 21 to cause an impact force between the stud 21 and the work piece 16. At the completion of the weld, the tip 21a is melted away and the stud 21 is permanently secured to the work piece 16 (FIG. 4).

It is to be understood that modifications and variations of the embodiments of the invention disclosed herein may be resorted to without departing from the spirit of the invention and the scope of the appended claims.

Having thus described my invention what I claim as new and desired to protect by Letters Patent is:

1. Apparatus for percussive welding a first metallic member to a second metallic member comprising:
    means for supporting the second member;
    means to move the first member into contact with the second member;
    means interconnecting the members for creating a flow of electrical current between the members upon the contact in order to form a weld therebetween; and
    gravity-controlled means connected to said moving means for impelling the first member to cause a single impact with the second member of sufficient magnitude to provide proper surfaces for welding,
    said interconnecting means comprises an overdamped electrical circuit having a damping factor D greater than 1 in which said damping factor D is represented by the following equation:

$$D = \frac{R}{2}\sqrt{\frac{C}{L}}$$

wherein R is the resistance of said circuit in series with the discharge path between the members, C is the capacitance of said circuit, and L is the inductance of said circuit.

2. The apparatus of claim 1 wherein said circuit includes a voltage source, a capacitor of said capacitance C charged thereby and connected in parallel with the discharge path between the members, and an inductor of said inductance L and variable resistor of said resistance R both connected in series with the discharge path, said variable resistor being set to overdamp said circuit.

References Cited
UNITED STATES PATENTS

| | | | |
|---|---|---|---|
| 1,066,468 | 7/1913 | Chubb | 219—95 |
| 2,685,630 | 8/1954 | Graham | 219—95 |
| 2,749,528 | 6/1956 | Albrecht | 219—96 XR |
| 3,114,031 | 12/1963 | Dash | 219—99 |
| 3,234,354 | 2/1966 | Penberg | 219—86 |
| 3,015,022 | 12/1961 | Bowers | 219—127 |
| 3,414,699 | 12/1968 | Neumeier et al. | 219—95 |
| 3,415,974 | 12/1968 | Graham | 219—95 |

JOSEPH V. TRUHE, Primary Examiner

MARTIN C. FLIESLER, Assistant Examiner

U.S. Cl. X.R.

219—95, 98